June 24, 1947.   C. J. RASMUSSEN   2,422,701
ELECTRIC ENGINE ORDER TELEGRAPH SYSTEM
Filed July 24, 1944      3 Sheets-Sheet 1
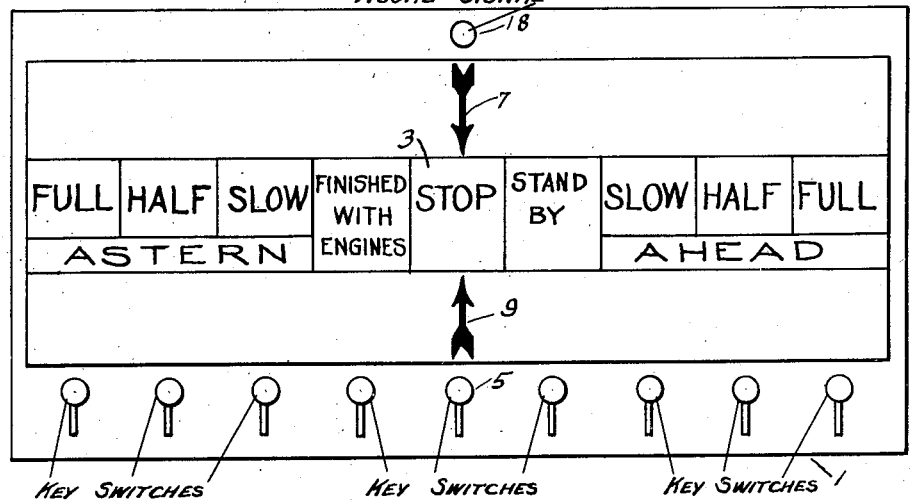
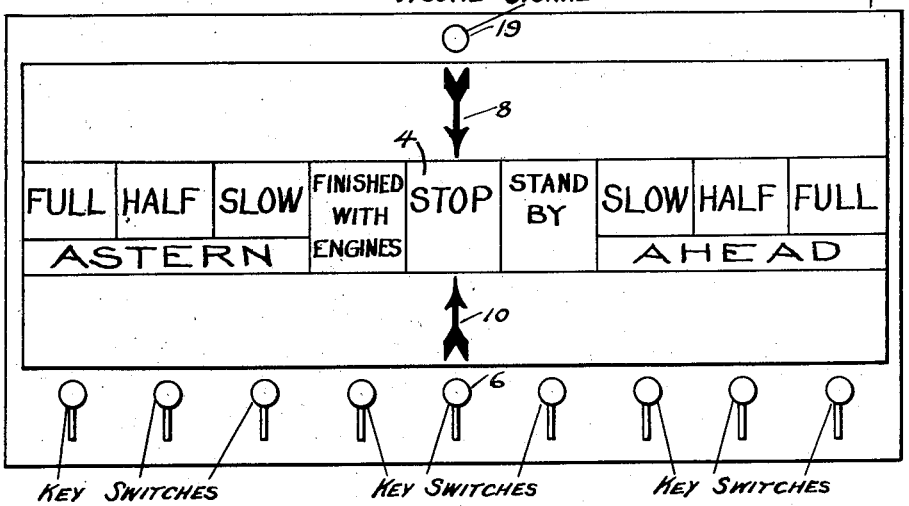
INVENTOR.
CARL J. RASMUSSEN
BY
J. F. Mothershead
Atty.

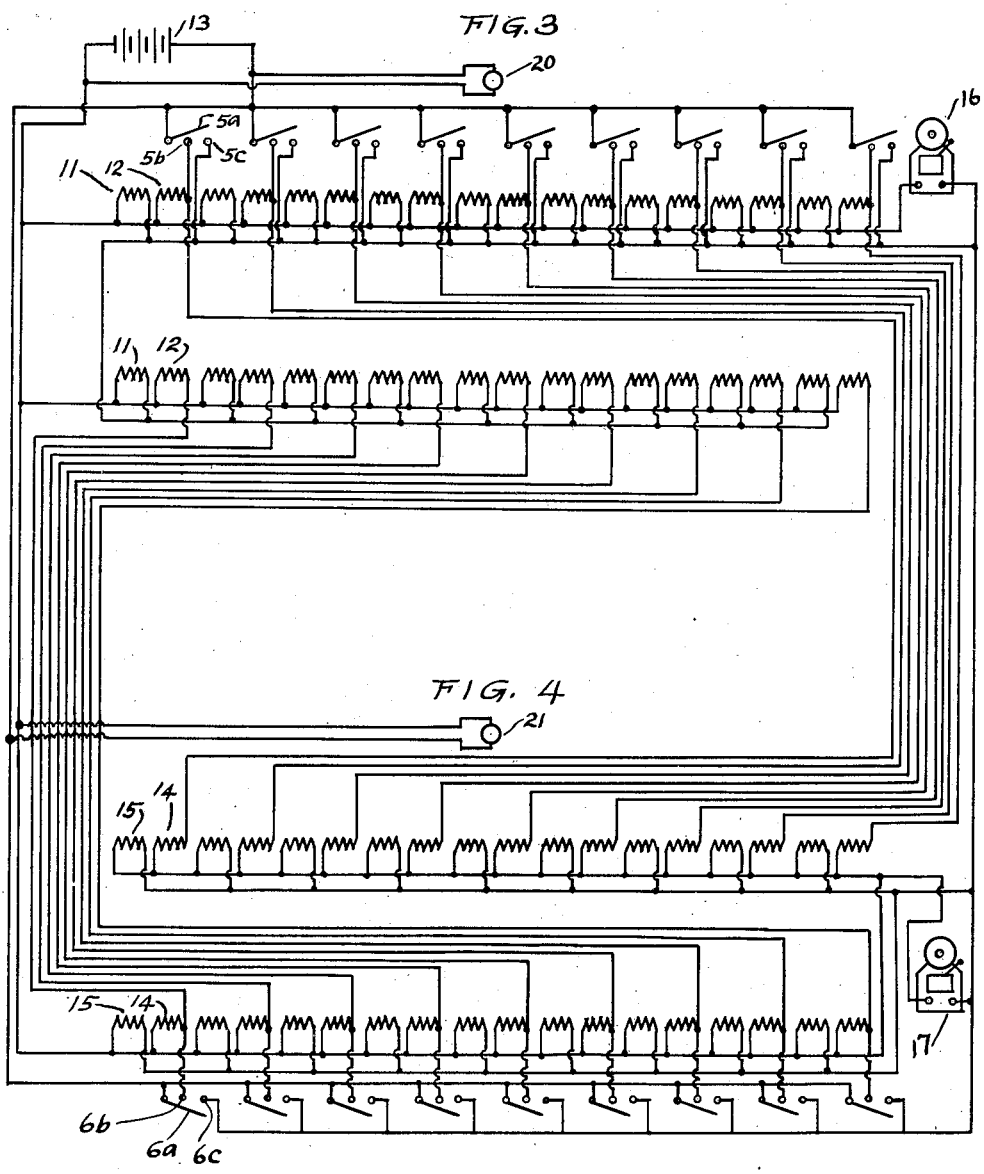

June 24, 1947.                C. J. RASMUSSEN                 2,422,701
                    ELECTRIC ENGINE ORDER TELEGRAPH SYSTEM
                    Filed July 24, 1944            3 Sheets-Sheet 3
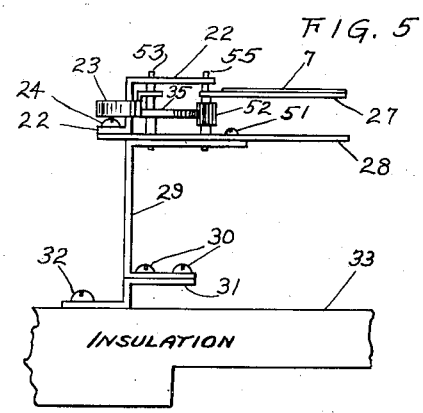
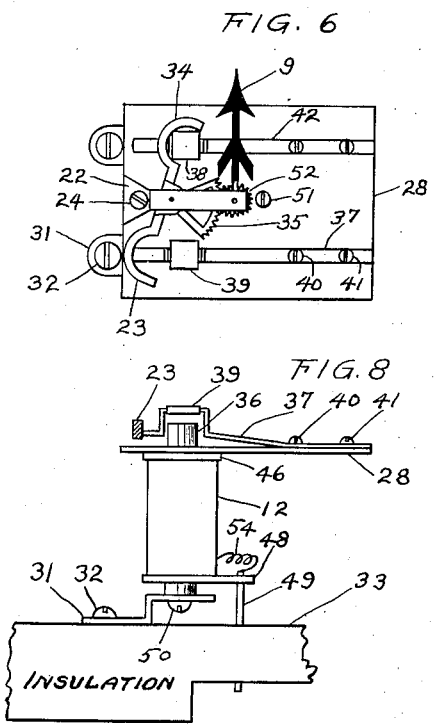
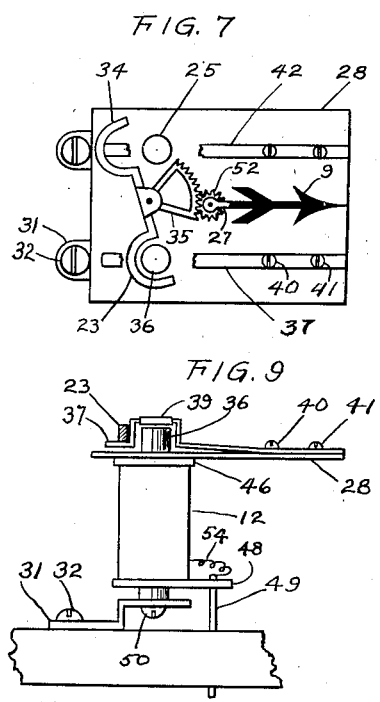
INVENTOR.
CARL J. RASMUSSEN
BY
J. F. Mothershead
Attorney.

Patented June 24, 1947

2,422,701

UNITED STATES PATENT OFFICE 2,422,701

ELECTRIC ENGINE ORDER TELEGRAPH SYSTEM

Carl J. Rasmussen, Berkeley, Calif.

Application July 24, 1944, Serial No. 546,421

5 Claims. (Cl. 177—334)

(Granted under the act of March 3, 1883, as amended April 30, 1928; 370 O. G. 757)

The invention described herein may be manufactured and used by or for the Government of the United States for governmental purposes without the payment to me of any royalty thereon in accordance with the provisions of the act of April 30, 1928, (Ch. 460; 45 Stat. L. 467).

This invention relates to signalling systems and more particularly to electrical engine order telegraph systems for signalling from a selected point such as the pilot house of a ship to the engine room of that ship and for other similar purposes.

The principal object of the invention is to provide a system for giving reliable, accurate and definite instructions to an engineer or operator in a ship's engine room or the like, from a position some distance therefrom, with provision for the engineer or operator to repeat back the instructions in order to show that they were properly received and carried out.

Other and further objects of the invention will appear more fully in the specification hereinafter following by reference to the accompanying drawings in which:

Figure 1 is a front elevational view of the transmitter instrument panel, which may for instance be located in the wheel house, bridge wings, after steering station, or any other location from which it is required to give signal to the engine room or the like. This instrument is known as the engine order transmitter.

Figure 2 is a similar view of the indicator instrument panel which may for instance be located in the engine room at the engineer's operating platform. This instrument is known as the engine order indicator. These instruments have the same outside appearance but differ as to their function which will be later shown.

Figure 3 is a wiring diagram of the engine order transmitter shown in Figure 1.

Figure 4 is a wiring diagram of the engine order indicator shown in Figure 2.

The apparatus shown in Figures 3 and 4 is connected together by multi-conducting cable.

Figure 5 is a detail end view of one of the indicating arrow mechanisms of the system with certain parts removed for clarity of illustration.

Figures 6 and 7 are detail front views of the indicating arrow mechanism with Figure 6 showing the indicating arrow in "off" position and Figure 7 showing the indicating arrow in "on" position. Certain of the parts are shown broken away in Figure 7 to more clearly show the associated parts that lie beneath.

Figures 8 and 9 are detail end views partially in section of the mechanism shown in Figures 6 and 7 respectively with the indicating arrow mechanism removed to more clearly show the association of the indicator latching springs in their respective "off" and "on" positions.

Referring to the drawings in more detail reference character 1 is the case of the transmitter shown in Figure 1 and reference character 2 is the case of the indicator shown in Figure 2. The markings 3 on the transmitter panel are the required instructions to the engineer or operator and are also shown as 4 on the indicator panel Figure 2. Switch 5 on the transmitter, of which there are a number similar thereto, is used to give the signal "stop" to the engineer and switch 6 on the indicator is used by the engineer to reply to the signal received on the indicator from the transmitter to show that the signal "stop" has been received. When the switch 5 is pressed down and closed the transmitter indicating arrow 7 comes into view above that switch and points to the marking 3 which contains the instructions given to the engineer in the engine room and simultaneously on the indicator in the engine room the indicating arrow 8 in Figure 2 comes into view and points to the marking 4 which is the same as the corresponding marking 3 on the transmitter panel, the engineer executes the order given and replies by pressing down switch 6. Indicating arrow 10 in Figure 2 comes into view and points to marking 4 on the indicator and simultaneously the indicating arrow 9 shown in Figure 1 comes into view and points to the marking 3 on the transmitter panel. The action of the engineer in replying to instructions received on the indicator is known by mariners as "repeat back." The same process is followed for any other order given from the transmitter panel and acknowledged by the engineer from the engine room.

In order to more fully understand the operation of this invention it will be necessary to describe the component parts of the transmitter and indicator and follow the circuit diagrams in Figures 3 and 4. Coils 11 and 12 and their like will be designated as "off" and "on" coils respectively and will be further known as a set of coils. A set of coils is required for each plate of instruction such as 3 and 4 in Figures 1 and 2. One of these sets of coils and its associated indicating arrow mechanism, etc. is shown in detail in Figures 6–9 inclusive and more fully described hereinafter. Coil 12 and its like and coil 14 and its like in Figures 3 and 4 are the "on" coils or the coils that bring indicating arrows 7 and 8 in Figures 1 and 2 or similar indicating arrows into view. Coil 11 and its like and coil 15 and its like in Figures 3 and 4 are the "off" coils or the coils that remove indicating arrows from view. Switch 5 on the transmitter panel in Figure 1 is shown in the circuit diagram Figure 3. The switch 5 is made up of the switch arm 5a, contact 5b, and contact 5c. When switch arm or blade 5a of switch 5 or its like is pressed down connection is first made with contact 5b which energizes the "on" coil 12 or its like in the transmitter and "on" coil 14 or its like at the indicator, which moves indicating arrows 7 and 8 or their like into position to show the order given. These two coils are energized from the battery 13 or some other suitable source of electrical potential having one terminal thereof normally connected to one terminal of the "on" coils and by having switch 5 through switch arm 5a and contact 5b connect the other terminal of the battery 13 to the other terminals of the associated "on" coils 12 and 14 or the like.

In the above description the effect of the closure of switch arm 5a with contact 5b has been dealt with but when the switch lever 5 in Figure 1 is moved downwardly two things occur, first a circuit is closed between 5a and 5b and then a circuit is closed between 5a and 5c. When the switch arm 5a or its like makes connections with contact 5c all of the "off" coils 11 and 15 are energized from the battery 13 which moves all of the indicating arrows from view with the exception of the pair moved to the "on" position by the energization of "on" coils 12 and 14 which were energized via switch arm 5a and switch contact 5b prior to the time any "off" coils were energized. When the switch arm 5a is returned to its original position due to spring action the "off" coil circuits are opened first at 5c and later the connection between 5b and 5a is broken leaving indicating arrows 7 and 8 in position as described more fully hereinafter. When another switch similar to 5 in the transmitter is pressed down the "off" coil 11 and its like in Figure 3 in the transmitter and coil 15 and its like in Figure 4 in the indicator are energized which removes their respective indicating arrows from view. It will be noted that bells 16 and 17 are connected in parallel with all of the "off" coils. These bells therefore ring when any "off" coil is energized. When the engineer repeats back by pressing down switch 6 or its like the "on" coils for operating appropriate lower indicating arrows 9 and 10 are energized from the battery 13 via 6a and 6b. Upon the further closure of switch 6 contact is made between 6a and 6c completing a circuit for ringing bells 16 and 17. These bells are audible signals for orders given and acted upon.

Character 18 in Figure 1 and character 19 in Figure 2 are green lenses covering lights 20 and 21 shown in Figures 3 and 4 respectively. The lights 20 and 21 are "circuit in order lights" which will show illumination through the green lenses 18 and 19 when the circuit is energized from electrical source 13. When the energizing circuit is out of order the "circuit in order lights" will cease illuminating the lenses. The set of coils 11 and 12 and their like have a mechanism which operates a lever when the "on" coil 12 is energized. The lever has an indicating hand or arrow mounted on it. When the "off" coil 11 is energized and the "on" coil 12 is deenergized the lever with the indicating hand or arrow is drawn to its original position out of sight. Switches 5 and 6 or their like are switches similar in outside appearance to the well-known toggle switch or its equivalent with the exception the switch handles are normally held in the upper or open position shown in Figures 1 and 2 by spring action. When the system is used aboard ship the switches should be of watertight construction.

Although it is contemplated that the mechanism for operating the indicating arrows 7—10 or the like may take on a number of forms, a preferred construction is shown in Figures 5–9.

In these figures reference character 33 is an insulating support on which bracket members 31 preferably of magnetic material are fastened by screws 32. A member 29 preferably of non-magnetic material is fastened to the bracket member 31 by screws 30 (Figure 5) with the member 29 supporting the plate 28 of non-magnetic material which is fastened to the member 29 by screws 51.

The bracket member 31 also carries soft iron cores 25 and 36 which are not shown in Figure 5 but are shown in Figures 7–9 inclusive. These cores are fastened to the bracket member 31 by screws 50. The cores extend from the bracket member 31 through close fitting apertures provided in the plate 28 as shown in Figures 7–9. The cores thus help to support the plate 28. The cores are provided with coils of wire wound thereon. Coil 12 is mounted on core 36 and coil 11 is mounted on core 25. These coils correspond to the similarly numbered coils or their counterparts in Figures 3 and 4. Each of the coils is wound on a spool having insulating end pieces 46 and 48 as shown in Figures 8 and 9. The coil terminals are connected by wires 54 to binding posts 49, only one of the pair of which can be seen in Figures 8 and 9. The binding posts 49 extend through the insulating member 33 to an open space for connections.

Two springs are mounted on plate 28, spring 37 is attached by means of screws 40 and 41 to have its free end overlie the core member 36. Spring 42 is similarly attached to have its free end overlie the core member 25. See Figures 6–9 inclusive. The springs 37 and 42 are offset where they pass over core members 36 and 25 respectively. These springs may be made of any good non-magnetic spring material such as Phosphor bronze or the like. The springs 37 and 42 are fitted at their offset portions with armatures 39 and 38 respectively of para-magnetic material so that with the magnetization of the respective cores by the energization of the coil thereon the springs will be pulled to the position of spring 37 in Figure 9.

Member 22 preferably of non-magnetic material is mounted on plate 28 by screw 24. The member 22 extends outwardly from the plate 28 and then parallel to it. The portion of the member 22 extending parallel to the plate 28 is provided with two holes positioned opposite two like positioned holes in plate 28. These pairs of holes serve as bearings for the pins 53 and 55. The pin 53 is positioned at a point equidistant from the cores 25 and 36 and parallel thereto. The pin 53 pivotally carries a unitary structure consisting of armatures 23 and 34 and gear sector 35. The armatures 23 and 34 are associated with the magnetizable cores 36 and 25 respectively while the gear sector 35 meshes with a pinion 52 carried on pin 55. The member 27 is fixed to pin 55 and extends radially therefrom. An indicating arrow or hand similar to one of the arrows 7, 8, 9 and 10 in Figures 1 and 2 is attached to member 27 to point in the appropriate direction.

In Figure 6 coil 11 on core 25 has been energized, magnetizing the core, whereupon armature 38 was attracted to the core carrying along the outer end of the spring 42, thus unlatching the armature 34 which was in turn attracted to the core 25, turning the gear sector 35 in a clockwise direction to drive pinion 52 counter-clockwise to withdraw the indicating arrow 9 out of view or to the "off" position.

In Figure 7 coil 12 on core 36 has been energized magnetizing the core, whereupon armature 39 was attracted to the core carrying along the outer end of the spring 37 thus unlatching the armature 23 which was in turn attracted to the core 36 turning the gear sector 35 in a counter-clockwise direction to drive pinion 52 clockwise to move the indicating arrow into view or to the "on" position.

While I have described my invention in certain preferred embodiments, I desire that it be understood that modifications may be made and that limitation upon my invention are intended other than are imposed by the scope of the appended claims.

I claim:

1. An electrical engine order telegraph system for transmitting instructions from a first point to a second point and for transmitting "repeat back" signals to said first point from said second point indicating that said instructions were received and carried out comprising a panel at each of said points, said panels each being provided with a plurality of plates of instruction, a switch individual to each of said plates of instruction, a pair of indicating markers individual to each of said plates of instruction, said markers being normally retracted from view beneath said plates of instruction, a pair of coils individual to each of said indicating markers comprising an "on" coil and an "off" coil, a source of potential common to all of said coils, means including the switch individual to one of said plates of instruction for completing a circuit from said source of potential to the "on" coils associated with similar plates of instruction on said two panels when said switch is initially closed, whereby the respective indicating markers associated with said coils are brought into view opposite corresponding plates of instruction on both of said panels, means including said switch individual to said plate of instruction when it is further depressed for energizing all of said "off" coils located at both of said panels whereby all of the indicating markers except the last one actuated are drawn to the "off" position, means for locking the last actuated indicating markers in "on" position until such time as the "off" coils of all of said indicating markers are energized upon the next operation of a different one of said switches.

2. A system as set forth in claim 1 including audible means for indicating when any one of said "off" coils are energized.

3. A system in accordance with claim 1 including signals on each of said panels for indicating when energy is available for operating said signals.

4. A system in accordance with claim 1 including "repeat back" mechanism whereby an operator at said second point may signal to said first point with signalling means similar to that used to signal from said first point to said second point as set forth in claim 1.

5. A signaling system for transmitting any selected one of a plurality of signals from a first point to a second point comprising a plurality of key switches at said first point corresponding to the respective ones of said signals to be transmitted, a plurality of indicators at said second point corresponding to respective ones of said switches, means for setting a selected one of said indicators at said second point to indicating position responsive to the closure at said first point of the switch corresponding thereto, means for normally maintaining said indicator in indicating position after the opening of said switch, and means for setting said indicator to non-indicating position responsive to the closure of another one of said switches in which each of said indicators includes an indicating hand, an "off" electromagnet and "on" electromagnet, and means for moving said indicating hand from "off" position to "on" position and vice versa responsive to the momentary energization of said "on" and "off" electromagnets respectively, said last mentioned means comprising a pivoted member adapted to be moved clockwise and counterclockwise by magnetic attraction of respective ones of said electromagnets, and means for locking said pivoted member and said indicating hand in the position to which they are last set by one of said electromagnets until the other of said electromagnets is energized.

CARL J. RASMUSSEN.

REFERENCES CITED

The following references are of record in the file of this patent:

UNITED STATES PATENTS

| Number | Name | Date |
|---|---|---|
| 860,001 | White | July 16, 1907 |
| 1,575,599 | Hornberger | Mar. 2, 1926 |
| 1,623,376 | Auth | Apr. 5, 1927 |
| 1,651,238 | Wood | Nov. 29, 1927 |
| 424,725 | Porter | Apr. 1, 1890 |
| 667,859 | Wood | Feb. 12, 1901 |
| 1,025,488 | Street | May 7, 1912 |
| 1,419,708 | Wood | June 13, 1922 |

FOREIGN PATENTS

| Number | Country | Date |
|---|---|---|
| 108,213 | Great Britain | Aug. 2, 1917 |

Certificate of Correction

Patent No. 2,422,701.  June 24, 1947.

CARL J. RASMUSSEN

It is hereby certified that error appears in the printed specification of the above numbered patent requiring correction as follows: Column 5, line 19, before the word "limitation" insert *no*; and that the said Letters Patent should be read with this correction therein that the same may conform to the record of the case in the Patent Office.

Signed and sealed this 26th day of August, A. D. 1947.

[SEAL]

LESLIE FRAZER,
*First Assistant Commissioner of Patents.*